US005317356A

United States Patent [19]
Dassero

[11] Patent Number: 5,317,356
[45] Date of Patent: May 31, 1994

[54] PHOTOGRAPHIC CAMERA WITH INTERIOR DUST SEAL

[75] Inventor: William F. Dassero, Rochester, N.Y.

[73] Assignee: Eastman Kodak Company, Rochester, N.Y.

[21] Appl. No.: 21,444

[22] Filed: Feb. 24, 1993

[51] Int. Cl.⁵ ............................................. G03B 17/02
[52] U.S. Cl. ................................................... 354/288
[58] Field of Search ...................... 354/288, 275–277, 354/21

[56] References Cited

U.S. PATENT DOCUMENTS 4,728,977  3/1988  Yomogizawa et al. ............. 354/187
4,870,437  9/1989  Omaki et al. ........................ 354/64
5,142,316  8/1992  Tanii et al. ...................... 354/288 X Primary Examiner—Michael L. Gellner
Assistant Examiner—J. K. Han
Attorney, Agent, or Firm—Roger A. Fields

[57] ABSTRACT

A photographic camera comprises a chamber for receiving a cartridge containing a filmstrip, a film exposing gate, and movable blocking means for sealing a film passage to the exposing gate which must be moved out of the way to permit a filmstrip from a cartridge in the chamber to be advanced to the exposing gate. The blocking means is positioned inside the chamber over a film egress opening to the film passage to be moved to uncover the film egress opening by a cartridge during insertion of the cartridge into the chamber.

5 Claims, 5 Drawing Sheets

PHOTOGRAPHIC CAMERA WITH INTERIOR DUST SEAL

BACKGROUND OF THE INVENTION

1. Field of the Invention

The invention relates generally to the field of photography, and in particular to a photographic camera with an interior dust seal.

2. Description of the Prior Art

U.S. Pat. No. 5,142,316, issued Aug. 25, 1992, discloses a photographic camera comprising a loading chamber for receiving a 35 mm cartridge containing a filmstrip, a film exposing gate, and movable light-blocking means for normally sealing a narrow film passage connecting the chamber and the exposing gate but which can be moved out of the way to permit the leading end of a filmstrip from a cartridge in the chamber to be advanced to the exposing gate. The light-blocking means is a pair of elastic members positioned within the narrow film passage in urged contact with each other to be pushed aside by the leading end of the filmstrip when the filmstrip is advanced from the cartridge.

3. Problem to be Solved by the Invention

In U.S. Pat. No. 4,870,437, it is taught that the leading end of a filmstrip advanced from a cartridge in the chamber is the preferred element for opening the light-blocking means to permit film access to the film exposing gate. A problem may occur, however, in that the filmstrip may not have sufficient longitudinal rigidity to force the leading end to push aside the elastic members. Consequently, a film jam can result.

SUMMARY OF THE INVENTION

According to the invention, a photographic camera comprising a chamber for receiving a cartridge containing a filmstrip, a film exposing gate, and blocking means which must be moved out of the way to permit a filmstrip from a cartridge in the chamber to be advanced to the film exposing gate, is characterized in that:

said blocking means includes movable means for being moved to move the blocking means out of the way responsive only to insertion of a cartridge into the chamber.

More particularly, a photographic camera comprising a chamber for receiving a cartridge containing a filmstrip, a film exposing gate, and movable blocking means for sealing a film passage to the exposing gate which must be moved out of the way to permit a filmstrip from a cartridge in the chamber to be advanced to the exposing gate, is characterized in that:

said blocking means is positioned inside the chamber over a film egress opening to the film passage to be moved to uncover the film egress opening by a cartridge during insertion of the cartridge into the chamber, whereby a filmstrip from the cartridge can be advanced through the film egress opening to the film passage.

DETAILED DESCRIPTION OF THE PREFERRED EMBODIMENT

The invention is disclosed as being embodied in a still-picture camera. Because the features of this type of camera are generally well known, the description which follows is directed in particular to those elements forming part of or cooperating directly with a preferred embodiment of the invention. It will be understood, however, that those elements not shown or described may take various forms known to a person of ordinary skill in the art.

Figure 1:
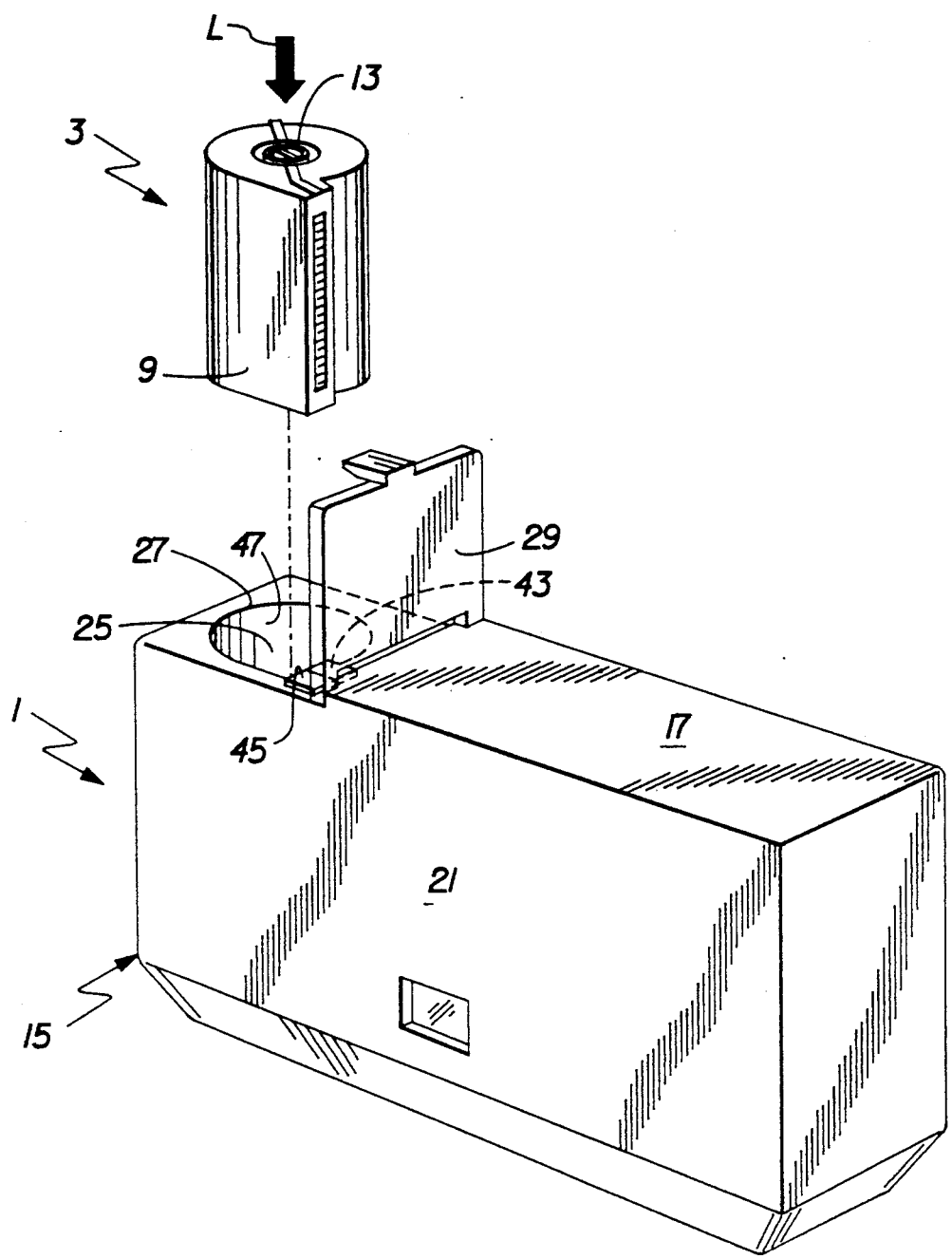
FIG. 1 is rear perspective view of a photographic camera according to a preferred embodiment of the invention, showing the camera upside down to depict how a cartridge containing a filmstrip is inserted into a loading chamber of the camera.
Figure 2:
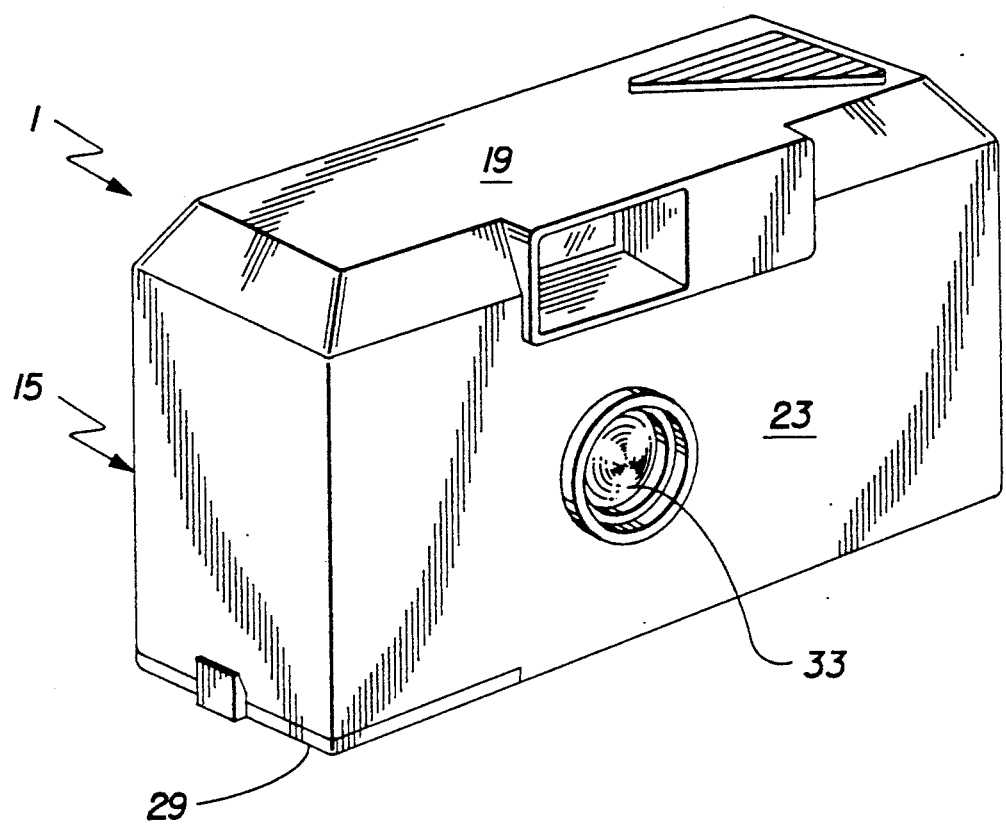
FIG. 2 is a front perspective view of the camera, showing the camera upright.

Referring to the drawings, FIGS. 1 and 2 show a photographic camera 1 to be used with a film cartridge 3. The cartridge 3 is identical to the one disclosed in commonly assigned U.S. Pat. No. 5,049,914, issued Sep. 17, 1991. In particular, it is capable of advancing a filmstrip 5 beginning with a leading film end 7 from inside a shell or housing 9 to outside the shell. This occurs when a film spool 13 on which the filmstrip 5 is wound inside the shell 9 is rotated in an unwinding direction. See FIG. 5.

As shown in FIGS. 1 and 2, the photographic camera 1 has a camera body 15 with a bottom face 17, a top face 19, a rear face 21, and a front face 23. A loading chamber 25 for receiving the cartridge 3 endwise in the direction L is formed in the camera body 15, and it has a loading opening 27 at the bottom face 17 of the camera body which is defined by a continuously enclosed perimeter substantially commensurate in shape with a general outline of the shell 9 of the cartridge 3. Consequently, only the cartridge 1 can be inserted into the loading chamber 25. That is, a conventional 35 mm cartridge which has a protruding film leader, not shown, cannot be inserted into the loading chamber 25 because the bottom face 17 of the camera body 15 will obstruct the protruding film leader. A cover door 29 normally covering the loading opening 27 is supported via a pivot pin, not shown, to be manually swung open to uncover the loading opening.

Figure 4:
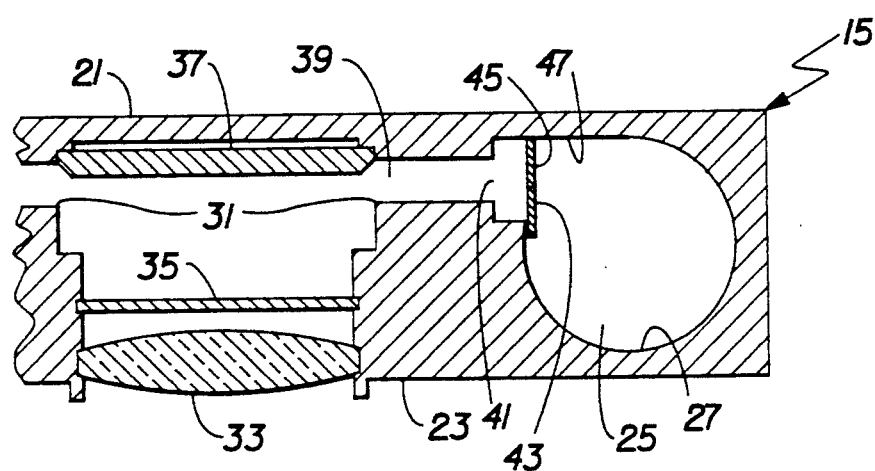
FIG. 4 is a partial section view of the camera, showing the loading chamber empty.
Figure 5:
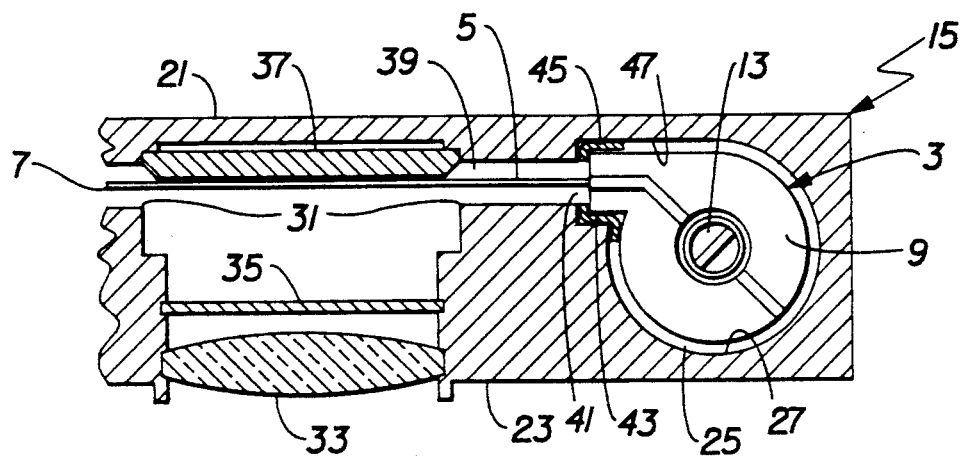
FIG. 5 is a partial section view similar to FIG. 4, showing a cartridge received in the loading chamber.

A conventional film exposing gate 31 is located in the camera body 15 as can be seen in FIGS. 4 and 5. A known taking lens 33, shutter 35, and film pressure pad 37 are aligned with the exposing gate 31. A narrow film passage 39 connects the exposing gate 31 and a film egress/ingress opening 41 at the loading chamber 25.

Figure 3:
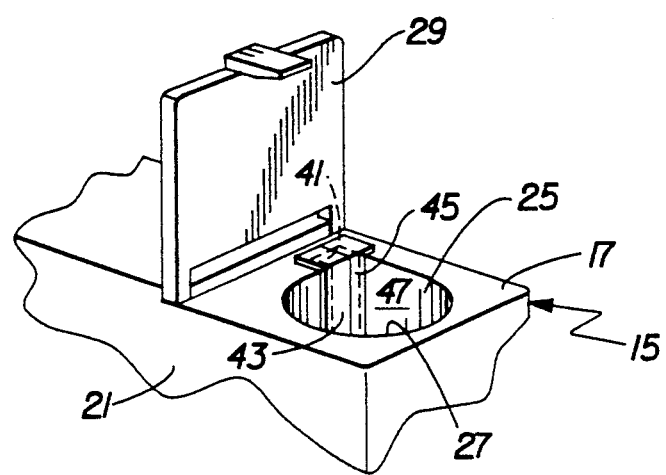
FIG. 3 is a front perspective view of a bottom portion of the camera including the loading chamber.

According to the invention, dust-blocking means are provided in the form of a pair of L-shaped opaque elastic sealing flaps 43 and 45 which are arranged in coplanar tightly-abutting relation and are affixed to the bottom face 17 of the camera body 15 and to an inner curved wall 47 that partially defines the loading chamber 25. See FIGS. 1, 3, and 4. In essence, the sealing flaps 43 and 45 constitute a pair of doors which are inherently urged closed to their abutting relation to cover the film egress/ingress opening 41 as shown in FIG. 4, but which can be readily pushed open inwardly to uncover the film egress/ingress opening as shown in FIG. 5. When they are closed, the sealing flaps 43 and 45 serve to deny unintended access to the film egress/ingress opening 41 from inside the loading chamber 25. Thus, the sealing flaps 43 and 45 prevent dust from reaching the film exposing gate 31 from the loading chamber 25 particularly when the cover door 29 is open as shown in FIG. 3.

The sealing flaps 43 and 45 are positioned in front of the film egress/ingress opening 41 in spaced relation as shown in FIG. 4 to allow them to be pushed open inwardly as shown in FIG. 5 by the cartridge 1 during insertion of the cartridge into the loading chamber 25. Once the sealing flaps 43 and 45 are opened as shown in FIG. 5, the leading end 7 of the filmstrip 5 can be advanced from the cartridge 3 through the film egress/ingress opening 41 into the film passage 39.

The invention has been described with reference to a preferred embodiment. However, it will be appreciated that variations and modifications can be effected by a person of ordinary skill in the art without departing from the scope of the invention. According to one example, instead of the sealing flaps 43 and 45 being arranged in tightly-abutting relation, they might slightly overlap each other. According to another example, an alternative sealing members instead of the sealing flaps 43 and 45 could be located inside the film passage 39 instead of inside the loading chamber 25, in which instance the sealing members would have to be connected to some actuating means for opening them which is located inside the loading chamber to be activated by the cartridge 1 during insertion of the cartridge into the loading chamber.

I claim:

1. A photographic camera comprising a chamber for receiving a cartridge containing a filmstrip, a film exposing gate, and movable blocking means for sealing a film passage to said exposing gate which must be moved out of the way to permit a filmstrip from a cartridge in said chamber to be advanced to the exposing gate, is characterized in that:

said blocking means is positioned inside said chamber over a film egress opening to said film passage to be moved to uncover said film egress opening by a cartridge during insertion of the cartridge into the chamber, whereby a filmstrip from the cartridge can be advanced through said film egress opening to said film passage.

2. A photographic camera comprising a chamber for receiving a cartridge containing a filmstrip, a film exposing gate, and blocking means which must be moved out of the way to permit a filmstrip from a cartridge in said chamber to be advanced to said film exposing gate, is characterized in that:

said blocking means includes movable means for being moved to move the blocking means out of the way responsive only to insertion of a cartridge into said chamber and without the filmstrip being advanced from the cartridge.

3. A photographic camera as recited in claim 2, wherein said moveable means is positioned inside said chamber to be moved to move said blocking means out of the way by a cartridge during insertion of the cartridge into the chamber.

4. A photographic camera as recited in claim 3, wherein a film passage extends between said chamber and said exposing gate, and said blocking means is positioned inside said chamber over a film egress opening to said film passage to block entry to the film passage from the chamber but is movable to uncover said film egress opening to permit entry to the film passage.

5. A photographic camera as recited in claim 4 wherein said blocking means and said movable means are at least one integrally formed elastic flap.

* * * * *